United States Patent [19]

Bednarek

[11] Patent Number: 4,821,792
[45] Date of Patent: Apr. 18, 1989

[54] HEATING AND COOLING SYSTEM FOR MOTOR VEHICLES

[75] Inventor: Henryk Bednarek, Landsberg, Fed. Rep. of Germany

[73] Assignee: Bayerische Motoren Werke AG, Munich, Fed. Rep. of Germany

[21] Appl. No.: 20,101

[22] Filed: Feb. 27, 1987

[30] Foreign Application Priority Data

Feb. 28, 1986 [DE] Fed. Rep. of Germany ....... 3606591

[51] Int. Cl.$^4$ .......................... B60H 3/00; F25B 29/00
[52] U.S. Cl. ......................................... 165/17; 165/29; 165/43; 237/2 A; 237/12.3 B; 98/2.01; 98/2.08; 98/2.09
[58] Field of Search .............. 165/29, 42, 43, 17; 237/2 A, 123 R, 12.3 B; 98/2.08, 2.09, 2.01; 62/324.1

[56] References Cited

U.S. PATENT DOCUMENTS

| | | |
|---|---|---|
| 3,690,549 | 9/1972 | Hardy .................. 237/2 A |
| 3,777,975 | 12/1973 | Kofink ............. 237/12.3 B |
| 4,143,706 | 3/1979 | Schnaibel et al. ..... 165/43 |
| 4,350,287 | 9/1982 | Richards ............... 98/2.08 |
| 4,384,608 | 5/1983 | Scarlett et al. ........ 165/43 |
| 4,412,424 | 11/1983 | Iida et al. ............... 98/2.09 |
| 4,653,689 | 3/1987 | Sakurai et al. ......... 165/42 |

FOREIGN PATENT DOCUMENTS

| | | | |
|---|---|---|---|
| 3318025 | 11/1984 | Fed. Rep. of Germany ........ 165/43 |
| 3047955 | 9/1986 | Fed. Rep. of Germany . |
| 2489017 | 2/1982 | France .................. 237/2 A |
| 2505989 | 11/1982 | France .................. 165/29 |
| 0126709 | 8/1982 | Japan .................... 98/2.08 |
| 0147909 | 9/1982 | Japan .................... 165/29 |
| 0015217 | 1/1985 | Japan .................... 165/29 |
| 0085017 | 5/1985 | Japan ................. 237/12.3 B |

Primary Examiner—Albert W. Davis, Jr.
Assistant Examiner—John K. Ford
Attorney, Agent, or Firm—Barnes & Thornburg

[57] ABSTRACT

In a heating and air-conditioning installation for motor vehicles with a cooling-medium circulatory system for the engine and with a reversible refrigerant circulatory system adapted to be shifted from cooling to heating, a control device is provided which in dependence on the adjustments of the operating elements for defrosting and/or heating, automatically engages the heating operation of the refrigerant circulatory system at outside temperatures below or slightly above the freezing point and which upon reaching a sufficiently high temperature of the engine cooling-medium automatically shifts to heating operation exclusively by means of the cooling-medium circulatory system.

5 Claims, 1 Drawing Sheet

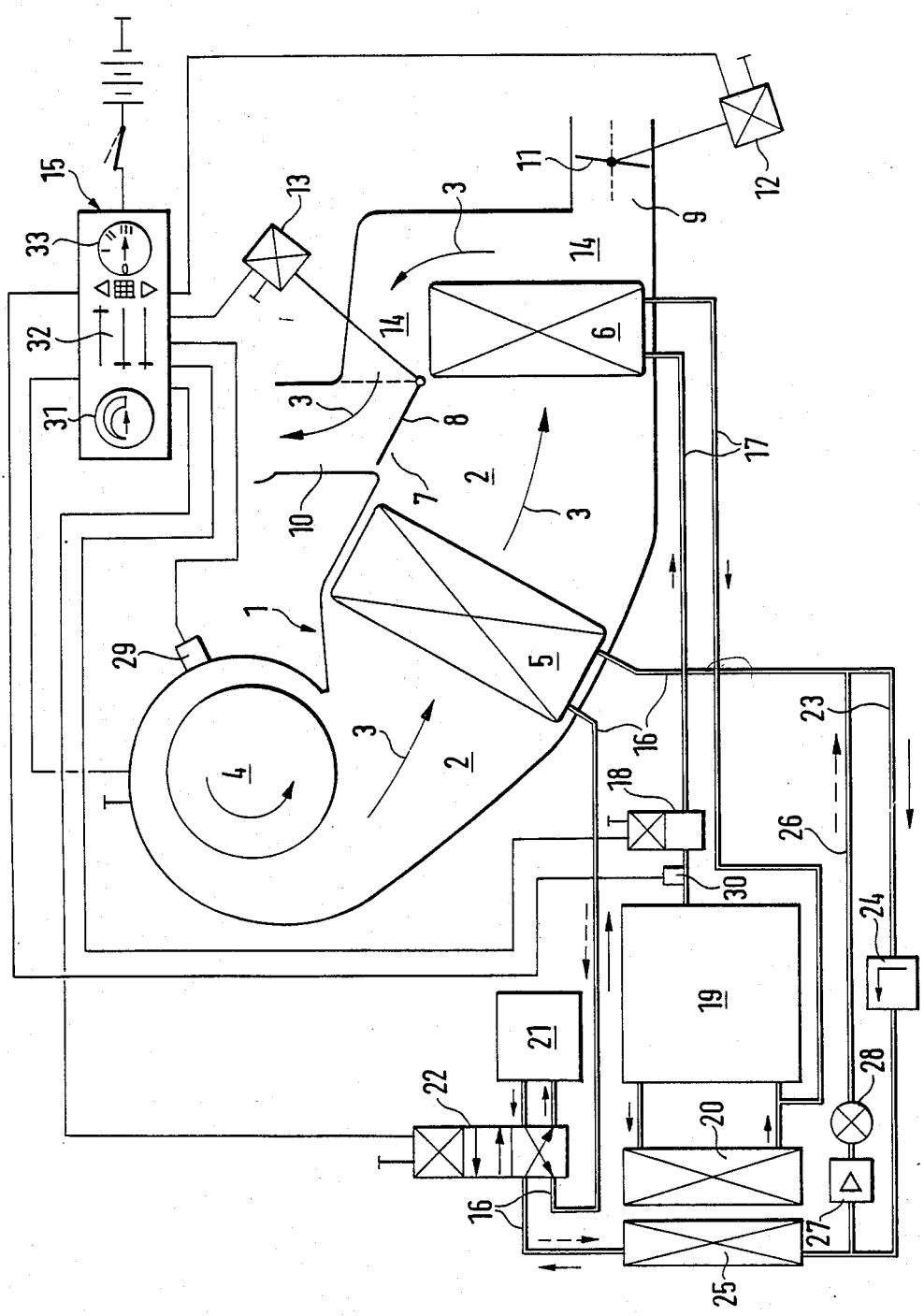

HEATING AND COOLING SYSTEM FOR MOTOR VEHICLES

The present invention relates to a heating and air-conditioning system for motor vehicles, with operating elements for selective adjustment of the functions of air-conditioning, heating, defrosting, ventilating, etc., in which a refrigerant circulatory system can be selectively engaged for cooling and heating and a cooling-medium circulatory system of an internal combustion engine can be selectively engaged for heating. In the installation of this type disclosed in the DE-OS No. 30 47 955, provision is made to engage the heating operation by means of the refrigerant circulatory system for the rapid warm-up of the vehicle interior space for such length of time until the temperature of the cooling-medium circulatory system suffices for the heating operation exclusively by this cooling-medium circulatory system.

It is the object of the present invention to so further develop the arrangement of the aforementioned type that without additional operating measures, the heating by means of the refrigerant circulatory system is automatically engaged in case of given requirement as also is automatically disengaged in case of sufficient heat output of the cooling-medium circulatory system. This is achieved according to the present invention in that in the heating and/or defrosting position of the operating elements, a control arrangement coupled with the operating elements automatically engages the heating by means of the refrigerant circulatory system and upon reaching a predetermined temperature of the cooling-medium, automatically shifts to exclusive heating by means of the cooling-medium circulatory system. The heating and defrosting function of the system is thereby operated without any additional actuating operation exclusively by means of the customary heating and defrosting actuating elements in the respectively most favorably operating manner, on the one hand, by means of the refrigerant cooling circulatory system and, on the other, by means of the cooling-medium circulatory system. Additional operating elements can thus be dispensed with so that the operation of motor vehicles equipped in such a manner is not additionally made more difficult.

According to another feature of the present invention, the heating operation by means of the refrigerant circulatory system is used only at outside temperatures about and below the freezing point so that the needed additional power requirement and fuel consumption is limited to this temperature range important to windshield defrosting for reasons of traffic safety. In a preferred embodiment according to the present invention, the control system engages the hating by means of the cooling circulatory system only at an outside temperature of less than 10° C., and more specifically at a temperature of less than about 0° C. to about 10° C.

According to still another feature of the present invention, the duration until reaching an effective heating-air temperature is reduced in that the heating air heated in the air/refrigerant heat-exchanger is conducted without heat loss in the cooling-medium heat-exchanger directly to the heating and/or defrosting outflow openings. This is achieved according to the present invention in that with heating and air-conditioning equipment, the system includes one air/refrigerant heat-exchanger and one air/cooling-medium heat-exchanger arranged one behind the other in the direction of the air flow and an air duct from the air/cooling-medium heat-exchanger to the heating and/or defrosting outflow openings, and in that during heating by means of the refrigerant circulatory system, a shifting valve connects the air duct to the outflow openings directly with the air/refrigerant heat-exchanger. Additionally, the control device automatically disconnects the cooling-medium circulatory system by means of a cooling-medium valve during heating by means of the refrigerant cooling circulatory system.

A rapid rise of th heating air temperature as well as also of the cooling-medium temperature and therewith of the engine operating temperature is achieved according to the present invention because, on the one hand, a heat transfer from the heating air to the cooling-medium and, on the other, a heat absorption of the cooling-medium proportion in the auxiliary heating circuit from the engine is precluded, when the control device automatically disconnects the cooling-medium flow through the cooling-medium heat-exchanger during heating by means of the refrigerant circulatory system.

According to still another feature of the present invention, in the system which includes heating and air-conditioning apparatus and an air/refrigerant heat-exchanger as well as an air/cooling-medium heat-exchanger in this sequence in the direction of air flow, the control device in the heating and/or defrosting position of the operating elements continuously connects the flow of the cooling-medium and of the air through the cooling-medium heat-exchanger independently of the engagement or disengagement of heating by means of the refrigerant circulatory system. With such an arrangement, the approximately same temperature rise of the heating air heated in the air/refrigerant heat-exchanger and of the cooling-medium heated in the engine, as determined in practice, is utilized in order to avoid any additional control means and control operations in the heating-air and cooling-medium temperature development. The far-reachingly same temperature developments of the heating air and of the cooling-medium practically preclude a mutual heat transfer and thus also a negative influence of the heating air temperature development as also of the engine temperature development. The influence of the relatively small cooling-medium volume which is to be heated in the auxiliary heating circuit, on the rise of the engine operating temperature is additional nearly insignificant in engines with combined cooling arrangements by reason of the relatively large stroke volumes thereof and therewith also of the relatively large cooling-medium volume in the engine main circulation.

These and other objects, features and advantages of the present invention will become more apparent from the following description when taken in connection with the accompanying drawing which shows, for purposes of illustration only, one embodiment in accordance with the present invention, and wherein:

The single FIGURE is a schematic view of a heating and air-conditioning arrangement for motor vehicles in accordance with the present invention.

Referring now to the single FIGURE of the drawing, a heating and air-conditioning equipment generally designated by reference numeral 1 includes within an air channel or duct 2 a fresh air-/recirculation-blower 4, and air/refrigerant heat-exchanger 5 and an air/cooling-medium heat-exchanger 6 connected one behind the other in the direction of air flow 3. An air outlet opening 7 is arranged between the two heat-exchangers 5 and 6 which is controllable by means of a shifting valve or flap 8. Heated air ducts or channels 9 to the leg space of the vehicle interior space and heated air ducts or channels 10 to the defrosting outlets within the area of the windshield of the vehicle adjoin one another in the direction of air flow 3 downstream of the air/cooling-medium heat-exchanger 6.

The heated air channel 6 to the leg space contains a control valve 11 which is adapted to be adjusted and closed by means of an adjusting motor 12. The heated air channel 10 to the defrost outlets is adapted to be connected by means of the shifting valve 8 selectively with the outflow opening 7 or with the warm air channel 14, respectively, to the outlet side of the air/cooling-medium heat-exchanger 6. Intermediate positions of the shifting valve 8 are also possible. The adjustments of the feed output of the blower 4 and of the shifting and control valves 8 and 11 are determined by the control device generally designated by reference numeral 15 which enables to the vehicle passengers the adjustments by means of rotary and slide control members and actuates by means of electric-electronic control elements of conventional type the adjusting motors 12 and 13. The control device 15 includes operating elements for selectively adjusting at least the functions of cooling, heating, defrosting and ventilating, as well as other functions by elements 31, 32 and 33.

The admission of the heat-exchangers 5 and 6 with the refrigerant, respectively, cooling medium, takes place by way of the refrigerant lines 16, respectively, cooling-medium lines 17. The cooling-medium flow is determined by a cooling-medium heating valve 18 adjustable at the control device 15, whereby the heat output of the air/cooling-medium heat-exchanger 6 is controllable depending on the valve adjustment and temperature of the cooling medium. The heating valve 18 can also be constructed as a conventional electronically controlled timing valve whose opening time intervals determine the volume of the cooling-medium flow. The cooling-medium lines 17 are connected to the customary cooling-medium circulatory system of the vehicle driving engine 19 equipped with a radiator 20. The refrigerant flow through the air/refrigerant heat-exchanger 5 and therewith both the cooling output during air-conditioning operation as also the heating output during heating operation of the cooling-medium circulatory system is determined by the operation of the refrigerant compressor 21 driven by the engine 19 by way of a customary clutch (not shown), whereby the refrigerant compressor 21 has on-periods of different length depending on the cooling output requirement and adjustment.

For shifting from cooling to heating operation, a four-way shifting valve 22 is built into the refrigerant line 16, which shifts to air-conditioning or heating depending on the adjustment of the control device 15. The flow direction in the refrigerant lines 16 is indicated for the heating operation illustrated in the drawing by full line arrows and for the cooling operation by dash arrows. Thus, during heating operation the refrigerant flows from the output of the compressor 21 through the four-way shifting valve 22 to the air/refrigerant heat-exchanger 5 which in this case acts as condenser and gives off the heat produced in the compressor to the heating air. The return contains a pressure-retaining valve 24 in a parallel line 23 and leads by way of a further air/cooling-medium heat-exchanger 25 acting as heat evaporator and by way of the four-way shifting valve 22 back to the inlet of the compressor 21.

For cooling operation, the four-way valve 22 is shifted by means of the control device 15. The refrigerant thereby flows corresponding to the dash arrows through the refrigerant lines 16, the further air/refrigerant heat-exchanger 25 acting as cooling condenser, the further parallel line 26 with one-way valve 27 and expansion valve 28 contained therein and by way of the air/refrigerant heat-exchanger 5 operating as cooling evaporator in the heating and air-conditioning apparatus 1 back to the one-way valve 22 and to the inlet of the compressor 21.

In addition to the customary mechanical, pneumatic, electro-magnetic or electric motor-driven adjusting devices for flaps, valves and switches as well as temperature sensors for the control or regulation of the heating and air-conditioning installation which are connected to the control device, according to the present invention, a further temperature sensor 29 for the outside temperature is provided at the air inlet of the blower 4 and a further temperature sensor 30 for the cooling-medium temperature in the engine cooling circulatory system is provided. The sensors 29 and 30 may also be components of the aforementioned control and regulating system of the heating and air-conditioning arrangement and may be used for several purposes. The temperature values of these sensors 29 and 30 effect in the control device 15 an automatic engagement and disengagement of the heating operation by means of the refrigerant circulatory system in the illustrated adjusting positions of the rotary and slide members in the control device 15 to the illustrated shifting positions of the shifting and control valves 8 and 11 and the heating operation as well as blower operation according to the usual defrost positions of such heating and air-conditioning installations. The control device 15 is thereby so matched that at an outside temperature within the range below and slightly above the freezing point of about +10° C. and lower, the heating operation by means of the refrigerant circulatory system is engaged by engagement of the refrigerant compressor 21 and by shifting the four-way shifting valve 22. After reaching the engine cooling-medium temperature of at least about 60° C., the control device 15 automatically shifts over to a heating operation exclusively by means of the cooling-medium circulatory system of the engine.

As with large-volume engines and according to practical test results, the temperatures of the heating air downstream of the air/refrigerant heat-exchanger 5 and of the cooling-medium in the air/cooling-medium heat exchanger 6 have approximately the same warm-up curve, the control device 15 automatically engages in the heating, respectively, defrost positions of its operating elements 31 for temperature, 32 for outflow opening and 33 for blower output, the heating operation of the cooling-medium circulatory system by opening of the cooling-medium heating valve 18 always independently of the temperature values at the sensors 29 and 30. For a particularly effective defrosting of the windshield, the control valve 11 for the heating-air channel 9 to the leg space is thereby appropriately closed. The shifting valve 8 is thereby in the illustrated position closing the outlet opening 7.

The most far-reaching agreement of the temperature of the heating air and of the temperature of the cooling-medium which both flow through the air/cooling-medium heat-exchanger 6 preclude any significant heat transfer between these two media. A further control operation for the cooling-medium heating valve 18 and the shifting valve 8 as also any impairment of the rapid rise of the heating action at the defrosting and heat-outflows, on the one hand, and of the rapid warm-up of the engine cooling circulatory system, on the other, is thereby dispensed with. Therebeyond, neither an additional operating element in the control device 15 nor an additional actuating operation are required by the automatic control of the refrigerant-heating operation in accordance with the present invention.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A heating and cooling installation for motor vehicles, comprising operating elements means for the selective adjustment of at least the functions of cooling, heating, defrosting and ventilating, reversible refrigerant circulatory means for reversibly circulating refrigerant through an air/refrigerant heat exchanger communicating with a compartment of the motor vehicle to cool and heat air for cooling and heating selections, respectively, cooling-medium circulatory means of an internal combustion engine for circulating cooling medium through an air/cooling medium heat exchanger communicating with said compartment for heating selection, and control means operatively connected with the operating elements means and operable for heating and defrosting selections for automatically heating by engaging said reversible refrigerant circulatory means only at an outside temperature of less than about 10° C., and upon reaching a predetermined temperature of the cooling-medium, for automatically shifting to heating exclusively by engaging said cooling-medium circulatory means.

2. An installation according to claim 1, wherein the control means automatically disengages the cooling-medium circulatory means during heating by the reversible refrigerant circulatory means by means of a cooling-medium valve.

3. An installation according to claim 1, with said heating and cooling installation having said air/refrigerant heat exchanger and said air/cooling medium heat exchanger arranged one behind the other in this sequence in the direction of air flow, further comprising an air channel means for channeling air from the air/cooling medium heat exchanger to heating and defroster outlet means, and a shifting valve means, controlled by the control means for directly connecting the air channel means with the air/refrigerant heat exchanger during heating with the reversible refrigerant circulatory means.

4. An installation according to claim 1, with said heating and cooling installation having said air/refrigerant heat exchanger and said air/cooling medium heat exchanger arranged one behind the other in this sequence in the direction of the air flow, and wherein the control means is operable in the heating and defrosting selections of the operating elements means to continuously engage the flow of the cooling-medium and of the air through the air/cooling medium heat exchanger independently of the engagement and disengagement of heating using the reversible refrigerant circulatory means.

5. A heating and cooling installation for motor vehicles, comprising operating elements means for the selective adjustment of at least the functions of cooling, heating, defrosting and ventilating, reversible refrigerant circulatory means for reversibly circulating refrigerant through means for refrigerant heat exchanging to cool and heat air for respective cooling and heating selections, cooling-medium circulatory means of an internal combustion engine for circulating cooling medium through means for cooling-medium heat exchanging to heat air for heating selection by an engaged fluid flow valve, said refrigerant and said cooling-medium heat exchanging means being arranged one behind the other in this sequence in the direction of air flow to a vehicle compartment, an air channel means including a shifting valve means for channeling air from either the cooling-medium heat exchanging means or said refrigerant heat exchanging means directly to said compartment as determined by said shifting valve means, and control means operatively connected with the operating elements means and operable for heating and defrosting selections for automatically heating using exclusively the refrigerant circulatory means by disengaging said fluid flow valve to interrupt cooling-medium circulating and positioning said shifting valve means to directly connect said refrigerant heat exchanging means with said air channel means, and upon reaching a predetermined temperature of the cooling-medium, for automatically shifting to heating exclusively using the cooling-medium circulatory means by re-engaging said fluid flow control valve and deactivating said reversible refrigerant circulating means and positioning said shifting valve means to connect said cooling-medium heat exchanging means with said air channel means.

* * * * *